(12) United States Patent
Carpenter et al.

(10) Patent No.: US 10,406,561 B2
(45) Date of Patent: Sep. 10, 2019

(54) VOLUMETRICALLY EFFICIENT LOADING OF CARTONS WITH INCREASED THROUGHPUT YIELD

(71) Applicant: Siemens Industry, Inc., Alpharetta, GA (US)

(72) Inventors: Michael D. Carpenter, Arlington, TX (US); Tamas Eger, Arlington, TX (US); Carsten Aschpurwis, Constance (DE)

(73) Assignee: SIEMENS LOGISTICS LLC, DFW Airport, TX (US)

( * ) Notice: Subject to any disclaimer, the term of this patent is extended or adjusted under 35 U.S.C. 154(b) by 0 days.

(21) Appl. No.: 16/051,595

(22) Filed: Aug. 1, 2018

(65) Prior Publication Data
US 2019/0039097 A1    Feb. 7, 2019

Related U.S. Application Data

(60) Provisional application No. 62/539,707, filed on Aug. 1, 2017.

(51) Int. Cl.
| | |
|---|---|
| *B07C 1/10* | (2006.01) |
| *B65G 47/14* | (2006.01) |
| *B65G 1/137* | (2006.01) |
| *B65G 57/03* | (2006.01) |
| *B07C 3/08* | (2006.01) |

(Continued)

(52) U.S. Cl.
CPC .............. *B07C 3/08* (2013.01); *B07C 1/10* (2013.01); *B07C 3/02* (2013.01); *B07C 5/36* (2013.01);

(Continued)

(58) Field of Classification Search
CPC ... B65G 1/00; B65G 1/02; B65G 1/06; B65G 1/04; B65G 1/1378; B65G 2201/0267

(Continued)

(56) References Cited

U.S. PATENT DOCUMENTS 6,139,240 A * 10/2000 Ando ................... B65G 47/844
                                                                    198/370.02
6,450,751 B1 * 9/2002 Hollander ............ B65G 1/1378
                                                                    198/347.4

(Continued)

FOREIGN PATENT DOCUMENTS

EP   3296235 A1   3/2018
EP   3296236 A1   3/2018

(Continued)

*Primary Examiner* — James R Bidwell

(57) ABSTRACT

Parcel processing systems and methods. A parcel processing system includes a parcel singulation transport configured to transport a stream of singulated parcels. The parcel processing system includes a parcel sorter configured to sort individual parcels in the stream of singulated parcels into a plurality of buffers. Multiple buffers comprise a set of buffers corresponding to a single load builder, and each buffer accumulates and buffers sorted parcels before transfer to the load builder. The parcel processing system includes a parcel flow merge configured to selectively receive buffered parcels from each of the buffers in the set and feed the received parcels to the load builder. The parcel processing system includes the load builder, configured to receive the parcels from the parcel flow merge and build successive stacks of parcels on a parcel pallet.

20 Claims, 3 Drawing Sheets

(51) Int. Cl.
  *B65B 35/44*    (2006.01)
  *B65B 43/52*    (2006.01)
  *B65G 57/24*    (2006.01)
  *B65B 57/04*    (2006.01)
  *B07C 3/02*     (2006.01)
  *B07C 5/36*     (2006.01)
  *B65G 47/68*    (2006.01)

(52) U.S. Cl.
  CPC .............. *B65B 35/44* (2013.01); *B65B 43/52* (2013.01); *B65B 57/04* (2013.01); *B65G 1/1378* (2013.01); *B65G 47/1492* (2013.01); *B65G 57/24* (2013.01); *B65G 47/684* (2013.01); *B65G 57/03* (2013.01); *B65H 2801/78* (2013.01)

(58) Field of Classification Search
  USPC ..... 198/347.4, 443; 414/268, 271, 277, 285, 414/286
  See application file for complete search history.

(56) References Cited

U.S. PATENT DOCUMENTS

| | | | | |
|---|---|---|---|---|
| 6,471,044 B1 * | 10/2002 | Isaacs | ................... | B65G 43/08 198/347.4 |
| 6,609,605 B1 * | 8/2003 | Linder | ............... | B65G 47/5104 198/347.1 |
| 7,988,406 B2 * | 8/2011 | Schafer | ................ | B65G 1/1378 414/286 |
| 8,086,344 B1 * | 12/2011 | Mishra | ............... | G06Q 30/0283 700/214 |
| 8,092,140 B2 * | 1/2012 | Baker | .................. | B65G 1/1373 198/347.4 |
| 8,301,298 B2 | 10/2012 | Bisse | | |
| 8,562,277 B2 | 10/2013 | Criswell | | |
| 8,651,794 B2 | 2/2014 | Pippin | | |
| 9,085,424 B2 | 7/2015 | Carpenter et al. | | |
| 9,280,756 B2 * | 3/2016 | Hara | ..................... | G05B 15/02 |
| 9,623,569 B2 | 4/2017 | McCollum et al. | | |
| 9,987,665 B2 | 6/2018 | Zatopek et al. | | |
| 2005/0259847 A1 | 11/2005 | Genc et al. | | |
| 2007/0246328 A1 | 10/2007 | Reznik | | |
| 2009/0136333 A1 * | 5/2009 | Schafer | ................ | B65G 1/1378 414/807 |
| 2018/0029082 A1 | 2/2018 | Eger et al. | | |
| 2018/0057284 A1 | 3/2018 | Carpenter et al. | | |

FOREIGN PATENT DOCUMENTS

| | | |
|---|---|---|
| WO | 0066280 A2 | 11/2000 |
| WO | 2017151897 A1 | 9/2017 |
| WO | 2018017218 A1 | 1/2018 |

* cited by examiner

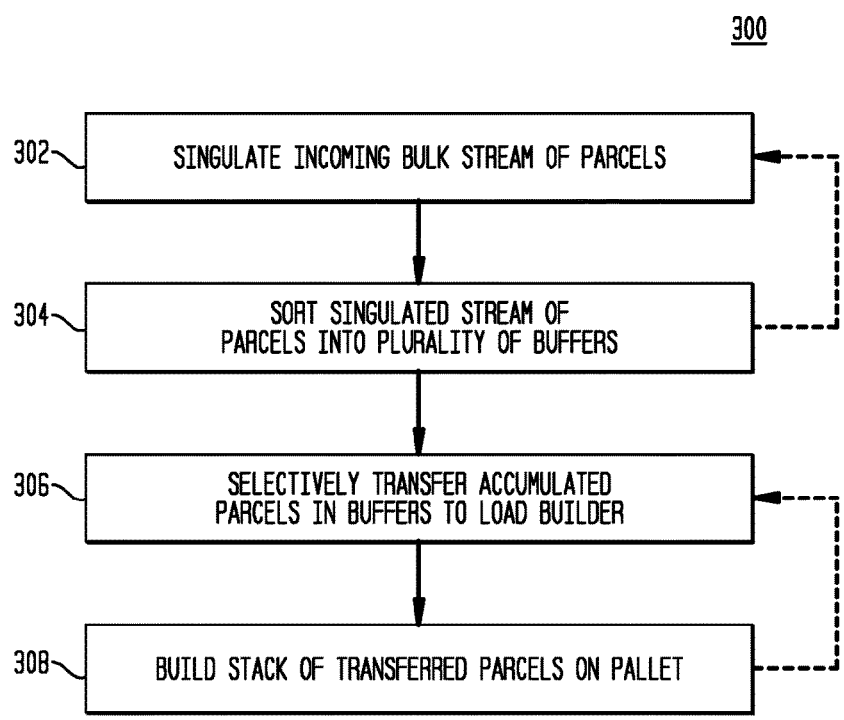

VOLUMETRICALLY EFFICIENT LOADING OF CARTONS WITH INCREASED THROUGHPUT YIELD

CROSS-REFERENCE TO OTHER APPLICATION

This application claims the benefit of the filing date of U.S. Provisional Patent Application 62/539,707, filed Aug. 1, 2017, which is hereby incorporated by reference.

TECHNICAL FIELD

Aspects of the present application generally relate to processing parcels, which can include any mail, package, flat, box, or similar object to be transported. In particular, aspects of the present application address automatic loading, accumulation, and unloading of parcels.

BACKGROUND OF THE DISCLOSURE

The common method of loading, accumulation, and unloading of parcels involves the manual loading and unloading of trailers. Improved systems and methods are desirable.

SUMMARY OF THE DISCLOSURE

Disclosed embodiments relate to systems and methods for volumetrically efficient loading of cartons with increased throughput yield, and other devices, systems, and methods as disclosed herein.

A parcel processing system includes a parcel singulation transport configured to transport a stream of singulated parcels. The parcel processing system includes a parcel sorter configured to sort individual parcels in the stream of singulated parcels into a plurality of buffers. Multiple buffers comprise a set of buffers corresponding to a single load builder, and each buffer accumulates and buffers sorted parcels before transfer to the load builder. The parcel processing system includes a parcel flow merge configured to selectively receive buffered parcels from each of the buffers in the set and feed the received parcels to the load builder. The parcel processing system includes the load builder, configured to receive the parcels from the parcel flow merge and build successive stacks of parcels on a parcel pallet.

In some embodiments, the parcel processing system further includes a control system configured to control the operation of the parcel singulation transport, the parcel sorter, the parcel flow merge, and the load builder. In some embodiments, the parcel singulation transport is further configured to singulate a bulk stream of parcels into the stream of singulated parcels. In some embodiments, the parcel singulation transport and parcel sorter operate concurrently to continuously sort the parcels into the buffers. In some embodiments, the parcel processing system includes a plurality of sets of buffers each including a plurality of buffers and each corresponding to a different load builder. In some embodiments, the parcel flow merge is a pivoting chute. In some embodiments, the parcel flow merge is a controllable conveyor system. In some embodiments, the load builder is a robotic load builder having one or more articulated robots. In some embodiments, the parcel pallet comprises a floor and a single front wall. In some embodiments, the parcel pallet includes a belt mounting system configured on the floor or front wall of the parcel pallet. In some embodiments, the parcel pallet is configured to be inserted, when loaded, into a trailer or container. In some embodiments, the set of buffers comprises four buffers.

A parcel processing method performed by a parcel processing system includes sorting a singulated stream of parcels into a plurality of buffers using a parcel sorter. Multiple buffers comprise a set of buffers corresponding to a single load builder, and each buffer accumulates and buffers sorted parcels before transfer to the load builder. The parcel processing method includes selectively transferring the parcels in one of the buffers in the set to a load builder using a parcel flow merge, building successive stacks of parcels on a parcel pallet using the load builder.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 illustrates a flowchart of a process in accordance with disclosed embodiments.

DETAILED DESCRIPTION

Figure 1:
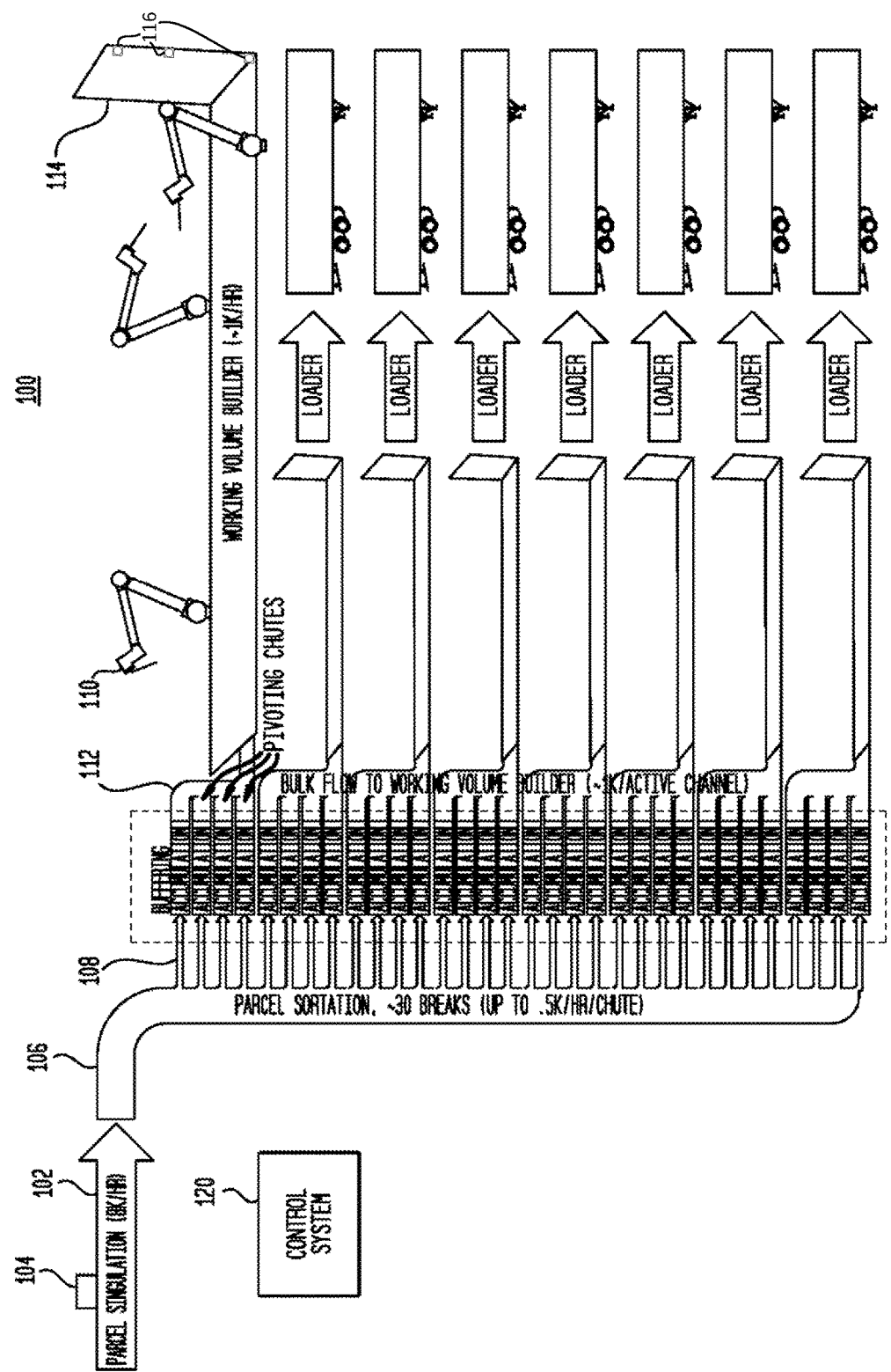
FIG. 1 illustrates an example of a parcel processing system in accordance with disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

As described above, a common method of loading, accumulation, and unloading of parcels involves the manual loading and unloading of trailers. Manual loading offers optimal volumetric utilization, but realizes about half of the productivity of manual unloading.

Automatic methods of loading parcels have been focused on the task of loading itself, such as described in U.S. Pat. No. 8,562,277 B2, hereby incorporated by reference. U.S. Pat. No. 8,562,277 is limited to the loading of cartons on a trailer itself. Similarly, U.S. Pat. No. 9,623,569 B2, hereby incorporated by reference, is limited in scope to the activity within the trailer.

These methods and systems duplicate the existing processing structure outside of the trailer and loading, they are able to achieve relatively efficient loading according to the proportion of capacity achieved, and their throughput generally approximates the average flow rate to the loading operation in parcel processing, which is driven by the rate of parcel sorting. For example, (8,250 Parcels per hour in sortation)/(32 sorting bins)=258 average parcels per hour per bin.

The systems taught by the above patents are primarily useful only in an ideal situation with balanced productivity from the sorter to the loading operation.

Unfortunately, the distribution among the 32 bins (for example) is seldom even, and is often highly unbalanced. Few of the bins receive the average volume, others either more or less, which would lead to either under or over utilization of robot loading equipment. Unlike manual operations, where multiple loader operators can work parallel in the same trailer, currently, multiple robotic loaders cannot work in parallel in a single trailer because of their large size.

This architecture described above also requires that each robot be able to deal with the full range of formats, sizes, weights, and shapes that may occur in the parcel stream, or that select classes are handled manually as exceptions. Given the broad spectrum of formats, sizes, weights, and shapes, either approach makes a comparatively expensive solution.

Disclosed embodiments solve the problem of unequal distribution and unbalanced utilization through a system of accumulation, whereby robotic loading resources are allocated when sufficient items have been buffered to ensure no break in productivity. In addition, the robotic resources in this invention are arranged in groups, with access from three sides rather than one, which allows:

Specialization among robot and end-effector types within a group, which significantly lowers cost by allowing simple items to be handled by simpler, cheaper robots.

Higher volumetric utilization, because for each item being placed, many more options for placement are available.

Robotic resources are grouped into load builders, which are based on a pallet system that forms two sides of a six-sided trailer: the floor and front wall. Built in to the floor and front wall can be a belt mounting system to support subsequent automatic unloading. The automatic unloading can be accomplished, for example, using a RUBUS® system as described in U.S. Pat. No. 8,651,794 B2, hereby incorporated by reference.

FIG. 1 illustrates an example of a parcel processing system 100 in accordance with disclosed embodiments. The various elements of parcel processing system 100 can be controlled by control system 120, which is configured to perform the processes described herein using the disclosed elements, and which can be implemented, for example, as data processing system 200 described below, where the various elements described below are the parcel processing equipment 228 described with respect to FIG. 2.

FIG. 1 shows an incoming parcel singulation transport 102 that transports a stream of singulated parcels, as illustrated by parcel 104. Parcel singulation transport 102 can be implemented as a simple conveyor with rollers or a belt, transporting an already-singulated stream of parcels, or can be implemented as a singulation system that singulates a bulk stream of parcels, such as described in patent documents U.S. Pat. No. 8,301,298, US20050259847, WO2000066280A2, US20070246328, EP3296236A1, EP3296235A1, or U.S. Pat. No. 9,085,424, each of which is hereby incorporated by reference.

Parcel singulation transport 102 transports the stream of singulated parcels 104 to parcel sorter 106. Parcel sorter 106 can be implemented, for example by sorting systems as described in patent documents EP3296235A1, EP3296236A1, WO2018017218A1, WO2017151897A1, US20180057284, US20180029082, or U.S. Pat. No. 9,987,665, each of which is hereby incorporated by reference.

The parcels 104 are sorted and accumulated into buffers 108 to create an adequate volume flow that provides continuous robotic operation. In this example, there are 32 buffers 108 feeding 8 load builders 110, though of course different numbers of each can be used. Buffers 108 accumulate parcels 104 that are commonly sorted, such as by shipping destination, intended placement within a container, or otherwise. Each buffer 108 can be implemented, for example, as one or more conveyor sections configured to receive the parcels 104 sorted to them and hold those parcels before forwarding the buffered parcels to the load builder.

In this example, each set of four buffers 108 is associated with each single load builder 110, but only one buffer 108 feeds parcels 104 to the load builder 110 at a time. A set of buffers 108 is configured to feed buffered parcels from the respective buffers into parcel flow merge 112.

Parcel flow merge 112 is configured to selectively receive buffered parcels 104 from each of the buffers 108 in a set and feed them to a load builder 110. Parcel flow merge 112 can be implemented, for example, as pivoting chutes configured to selectively receive buffered parcels 104 from each of the buffers 108 in a set and deposit them on an output conveyor that transports them to load builder 110. Parcel flow merge 112 can be implemented, for example, as a controllable conveyor system, using belts or rollers, that selectively receives buffered parcels 104 from each of the buffers 108 in a set and deposit them on an output conveyor that transports them to load builder 110.

Load builder 110 can be a robotic load builder having one or more articulated robots configured to receive a stream of parcels from parcel flow merge 112 and build successive stacks/loads of parcels as they are received, under the control of control system 120. The load builder can build the parcel stacks according to such factors as parcel sizes, dimensions, weights, destinations, sturdiness/fragility, or other factors.

In various embodiments, the load builders 110 build the stacks of parcels on parcel pallets 114, which can then be stored or loaded into trailers or other containers. In various embodiments, parcel pallets 114 have two structures, a floor and a single wall, corresponding to two sides of a six-sided trailer or container: the floor and front wall. The "front" wall of parcel pallet 114 refers to a wall on the end, lengthwise, of the pallet, which would typically be loaded first into a trailer so that it is adjacent to the trailer's front wall. The articulated robots of load builder 110 can operate from any "open" side of the floor of parcel pallet 114—that is, from above, the rear, and either side—so that the stacks of parcels can be more efficiently created than in systems that must operate within a closed trailer or container. The parcel pallet 114 can include a belt mounting system 116, configured on the floor and/or front wall of the parcel pallet, to support subsequent automatic unloading.

As illustrated in FIG. 1, multiple buffers 108 are divided into multiple sets of buffers, where each buffer 108 in a set is connected to a parcel flow merge 112 with an output to a load builder 110.

Figure 2:
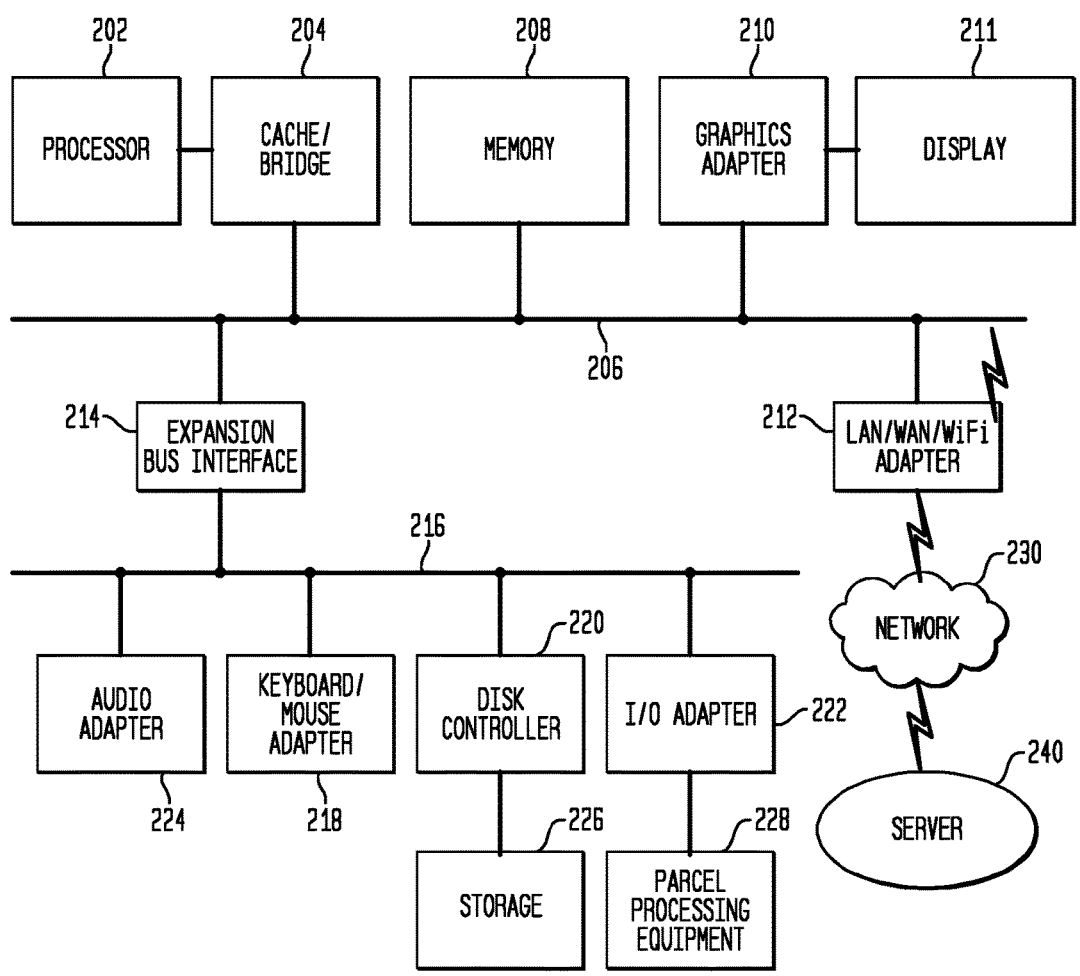
FIG. 2 illustrates a block diagram of a data processing system with which an embodiment can be implemented.

FIG. 2 depicts a block diagram of a data processing system 200 with which an embodiment can be implemented, for example as a system for implementing any of the devices, methods, or systems described herein, and can be configured to perform processes as described herein. The data processing system depicted includes a processor 202 connected to a level two cache/bridge 204, which is connected in turn to a local system bus 206. Local system bus 206 may be, for example, a peripheral component interconnect (PCI) architecture bus. Also connected to local system bus in the depicted example are a main memory 208 and a graphics adapter 210. The graphics adapter 210 may be connected to display 211.

Other peripherals, such as local area network (LAN)/Wide Area Network/Wireless (e.g. WiFi) adapter 212, may also be connected to local system bus 206. Expansion bus interface 214 connects local system bus 206 to input/output (I/O) bus 216. I/O bus 216 is connected to keyboard/mouse adapter 218, disk controller 220, and I/O adapter 222. Disk controller 220 can be connected to a storage 226, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 222 can be connected to control or communicate with parcel processing equipment 228, which can include transport devices or conveyors, unloaders, sensors, booms, or any other hardware disclosed herein or other hardware devices for processing parcels in accordance with the various embodiments described herein.

Also connected to I/O bus 216 in the example shown is audio adapter 224, to which speakers (not shown) may be connected for playing sounds. Keyboard/mouse adapter 218 provides a connection for a pointing device (not shown), such as a mouse, trackball, trackpointer, etc.

Those of ordinary skill in the art will appreciate that the hardware depicted in FIG. 2 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 212 can be connected to a network 230 (not a part of data processing system 200), which can be any public or private data processing system network or combination of networks, as known to those of skill in the art, including the Internet. LAN/WAN/Wireless adapter 212 can also perform other data processing system or server processes described herein. Data processing system 200 can communicate over network 230 with one or more server systems 240, which are also not part of data processing system 200, but can be implemented, for example, as separate data processing systems 200. A server system 240 can be, for example, any of the other systems described herein, and so indicates how systems can intercommunicate over network 230.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

FIG. 3 illustrates a flowchart of a process in accordance with disclosed embodiments that can be performed by a parcel processing system as disclosed herein.

The parcel processing system singulates an incoming bulk stream of parcels into a singulated stream of parcels (302). Note that this step need only be performed if the stream of parcels is not already singulated.

The parcel processing system sorts the singulated stream of parcels into a plurality of buffers (304). The buffers accumulate sorted parcels until the accumulated, sorted parcels in that buffer are ready to be loaded. The buffers are organized into sets of buffers, where each set of buffers accumulates parcels destined for the same load builder. Of course, in simpler parcel processing systems, there may be only a single set of buffers accumulating parcels for a single load builder.

Processes 302 and 304 can be performed on an ongoing basis so that the incoming stream of parcels is continually singulated and sorted into the buffers.

The parcel processing system selectively transfers the accumulated parcels in one of the buffers in a set to a load builder using a parcel flow merge (306).

The parcel processing system builds a stack of the transferred parcels using a load builder (308). In specific cases the stack is built on a pallet as described above.

Processes 306 and 308 can be performed repeatedly whenever the load builder is ready to process a new set of sorted, buffered parcels, by switching the parcel flow merge to transfer accumulated parcels from a different one of the buffers in the set.

The loaded pallet can then be stored or placed into a trailer or other container.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A parcel processing system, comprising:
   a parcel singulation transport configured to transport a stream of singulated parcels;
   a parcel sorter configured to sort individual parcels in the stream of singulated parcels into a plurality of buffers, wherein multiple buffers comprise a set of buffers corresponding to a single load builder, and each buffer accumulates and buffers sorted parcels before transfer to the load builder;
   a parcel flow merge configured to selectively receive buffered parcels from each of the buffers in the set and feed the received parcels to the load builder; and
   the load builder, configured to receive the parcels from the parcel flow merge and build successive stacks of parcels on a parcel pallet.

2. The parcel processing system of claim 1, further comprising a control system configured to control the operation of the parcel singulation transport, the parcel sorter, the parcel flow merge, and the load builder.

3. The parcel processing system of claim 1, wherein the parcel singulation transport is further configured to singulate a bulk stream of parcels into the stream of singulated parcels.

4. The parcel processing system of claim 1, wherein the parcel singulation transport and parcel sorter operate concurrently to continuously sort the parcels into the buffers.

5. The parcel processing system of claim 1, wherein the parcel processing system includes a plurality of sets of buffers each including a plurality of buffers and each corresponding to a different load builder.

6. The parcel processing system of claim 1, wherein the parcel flow merge is a pivoting chute.

7. The parcel processing system of claim 1, wherein the parcel flow merge is a controllable conveyor system.

8. The parcel processing system of claim 1, wherein the load builder is a robotic load builder having one or more articulated robots.

9. The parcel processing system of claim 1, wherein the parcel pallet comprises a floor and a single front wall.

10. The parcel processing system of claim 9, wherein the parcel pallet includes a belt mounting system configured on the floor or front wall of the parcel pallet.

11. The parcel processing system of claim 9, wherein the parcel pallet is configured to be inserted, when loaded, into a trailer or container.

12. The parcel processing system of claim 1, wherein the set of buffers comprises four buffers.

13. A parcel processing method performed by a parcel processing system, comprising:
   sorting a singulated stream of parcels into a plurality of buffers using a parcel sorter, wherein multiple buffers comprise a set of buffers corresponding to a single load builder, and each buffer accumulates and buffers sorted parcels before transfer to the load builder;
   system selectively transferring the parcels in one of the buffers in the set to a load builder using a parcel flow merge;
   building successive stacks of parcels on a parcel pallet using the load builder.

14. The parcel processing method of claim 13, further comprising singulating a bulk stream of parcels into the stream of singulated parcels.

15. The parcel processing method of claim 13, wherein sorting a singulated stream of parcels is performed continuously as the singulated stream of parcels is received.

16. The parcel processing method of claim 13, wherein the parcel flow merge is a pivoting chute.

17. The parcel processing method of claim 13, wherein the parcel flow merge is a controllable conveyor system.

18. The parcel processing method of claim 13, wherein the load builder is a robotic load builder having one or more articulated robots.

19. The parcel processing method of claim 13, wherein the parcel pallet comprises a floor and a single front wall.

20. The parcel processing method of claim 19, wherein the parcel pallet includes a belt mounting system configured on the floor or front wall of the parcel pallet.

* * * * *